United States Patent
Shigemizu

(10) Patent No.: US 9,124,102 B2
(45) Date of Patent: Sep. 1, 2015

(54) BATTERY SYSTEM

(75) Inventor: Tetsuro Shigemizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 539 days.

(21) Appl. No.: 13/522,531

(22) PCT Filed: Jan. 18, 2011

(86) PCT No.: PCT/JP2011/050741
§ 371 (c)(1),
(2), (4) Date: Jul. 17, 2012

(87) PCT Pub. No.: WO2011/087128
PCT Pub. Date: Jul. 21, 2011

(65) Prior Publication Data
US 2012/0299597 A1  Nov. 29, 2012

(51) Int. Cl.
*G01R 31/36* (2006.01)
*H02J 7/00* (2006.01)
(Continued)

(52) U.S. Cl.
CPC ........... *H02J 7/0013* (2013.01); *H01M 10/441* (2013.01); *H01M 10/482* (2013.01); *H01M 10/488* (2013.01); *H02J 7/0021* (2013.01); *Y02T 10/7055* (2013.01)

(58) Field of Classification Search
CPC ............... G01R 31/36; G01R 31/3606; G01R 31/3624; G01R 31/3658; G01R 31/3662; G01R 31/3679; H02J 7/007; H02J 7/0021; H02J 7/0093; H02J 7/04; H02J 7/0045; H02J 2007/005
USPC ............ 702/63; 320/112, 118, 127–128, 134, 320/136–137, 160, 162; 324/426, 433–434
See application file for complete search history.

(56) References Cited

U.S. PATENT DOCUMENTS

| 6,104,166 A | 8/2000 | Kikuchi et al. |
| 2008/0100265 A1* | 5/2008 | Lim et al. ...................... 320/134 |
| 2008/0122407 A1 | 5/2008 | Khashayar |

FOREIGN PATENT DOCUMENTS

| CN | 1556758 A | 12/2004 |
| JP | 11-185823 A | 7/1999 |

(Continued)

OTHER PUBLICATIONS

Notice of Allowance dated Apr. 22, 2013, issued in corresponding Korean Patent Application No. 10-2012-7003302, w/English translation.

(Continued)

*Primary Examiner* — Toan Le
(74) *Attorney, Agent, or Firm* — Westerman, Hattori, Daniels & Adrian, LLP

(57) ABSTRACT

In a battery system of the invention, a BMS calculates a maximum charge rate representing a maximum value from present charge rates of plurality of secondary batteries constituting an assembled battery and a minimum charge rate. Then, the BMS generates a normal waveform signal in which the maximum charge rate is determined as a maximum peak and the minimum charge rate is determined as a minimum peak as a waveform signal which is displayed in a charge rate display range where a full charge rate in the case of a full charge state of the secondary battery is determined as an upper limit and an empty charge rate in the case of an empty charge state of the secondary battery is determined as a lower limit. Then, the BMS displays the normal waveform signal in the charge rate display range.

12 Claims, 6 Drawing Sheets

(51) Int. Cl.
*H01M 10/44* (2006.01)
*H01M 10/48* (2006.01)

(56) References Cited

FOREIGN PATENT DOCUMENTS

| JP | 2001-153935 A | 6/2001 |
|---|---|---|
| JP | 3533076 B2 | 5/2004 |
| KR | 10-2000-0012021 A | 2/2000 |
| KR | 10-2009-0067054 A | 6/2009 |
| WO | 2009/050406 A2 | 4/2009 |
| WO | 2010/140235 A1 | 12/2010 |

OTHER PUBLICATIONS

Chinese Office Action dated Mar. 13, 2014, issued in Chinese Patent Application No. 201180003597.X, w/English translation, (10 pages).

International Search Report of PCT/JP2011/050741, mailing date Mar. 29, 2011; wlEnglish translation.

Written Opinion of of PCT/JP2011/050741, mailing date Mar. 29, 2011; w/English translation.

* cited by examiner

BATTERY SYSTEM

FIELD OF THE INVENTION

The present invention relates to a battery system that displays a charge rate of a secondary battery.

Priority is claimed on Japanese Patent Application No. 2010-008039, filed on Jan. 18, 2010, the content of which is incorporated herein by reference.

DESCRIPTION OF BACKGROUND ART

In a device which uses an assembled battery formed by connecting plurality of secondary batteries to each other as a power supply, the charge rate of the assembled battery is detected and the detected information is used to recognize the charging start timing or the charging completion timing. Then, a technique of displaying the charge rate is disclosed in Patent Document 1.

CITATION LIST

Patent Literature

[Patent Document 1] Japanese Patent No. 3533076

SUMMARY OF THE INVENTION

Problem to be Solved by the Invention

However, in the above-described system which uses the assembled battery as the power supply, the charge rates of the respective secondary batteries constituting the assembled battery are different from each other. For this reason, the secondary battery representing the maximum charge rate is controlled so that its value is not larger than the value of the charge rate in the full charge state during the charging operation, and the secondary battery representing the minimum charge rate is controlled so that its value is not lower than the value of the charge rate which corresponds to an empty charge status (hereinafter, referred to as an empty charge state) during a discharging operation. Then, it is desirable that the system which uses the assembled battery as the power supply performs a process of preventing aged degradation in the secondary battery with such a control and the user easily recognize the charge rate of the secondary battery in a state where the system has a simple configuration.

Further, when the assembled battery is charged, there is a need to charge paying attention so that the charge rate of the secondary battery is not larger than the value of the charge rate in the full charge state. Accordingly, even in this case, it is desirable to adopt a configuration in which the user of the system may easily recognize the charge rate of the secondary battery while the system using the assembled battery as the power supply has a simple configuration.

It is an object of the invention to provide a battery system which allows a user of a device to easily recognize a charge rate of a secondary battery in a state where a system using an assembled battery as a power supply has a simple configuration.

Means for Solving the Problem

A battery system of the invention includes a battery control device and a display device.

The battery control device includes a maximum charge rate calculating unit that calculates a maximum charge rate representing a maximum value from present charge rates of a plurality of secondary batteries constituting an assembled battery, a minimum charge rate calculating unit that calculates a minimum charge rate representing a minimum value from the present charge rates of the respective secondary batteries, and a waveform generating unit that generates a normal waveform signal which has the maximum charge rate determined as a maximum peak and the minimum charge rate determined as a minimum peak, wherein a waveform signal which is displayed in a charge rate display range which has a full charge rate, in the case of a full charge state of the secondary battery, determined as an upper limit and an empty charge rate, in the case of an empty charge state of the secondary battery, determined as a lower limit.

The display device includes a charge rate display unit that displays the normal waveform signal in the charge rate display range.

An aspect of the battery system of the invention includes an abnormality detecting unit that detects abnormality in the secondary battery, wherein the waveform generating unit may generate an abnormal waveform signal which has the full charge rate determined as the maximum peak and the empty charge rate determined as the minimum peak, and wherein the charge rate display unit may display the abnormal waveform signal in the charge rate display range instead of the normal waveform signal.

In the battery system of the invention, the charge rate display unit may alternately display the normal waveform signal and the abnormal waveform signal in the charge rate display range.

Another aspect of the battery system of the invention further includes an abnormality detecting unit that detects abnormality in the secondary battery, wherein the waveform generating unit may generate an abnormal waveform signal which has the full charge rate determined as the maximum peak and the empty charge rate determined as the minimum peak, and wherein the charge rate display unit may display the normal waveform signal and the abnormal waveform signal in the charge rate display range.

In the battery system of the invention, the waveform generating unit may generate the abnormal waveform signal in which a value of an index charge rate calculated from the present charge rates of the respective secondary batteries is determined as a base position of a waveform.

In the battery system of the invention, the display device may include an abnormal signal output unit that outputs an abnormal signal representing abnormality in the assembled battery when a difference between the maximum charge rate and the minimum charge rate is equal to or larger than a threshold value.

Effects of the Invention

According to the invention, it is possible to provide a battery system which allows a user of a device to easily recognize a charge rate of a secondary battery while a system using an assembled battery as a power supply has a simple configuration.

EMBODIMENTS OF THE INVENTION

Figure 1:
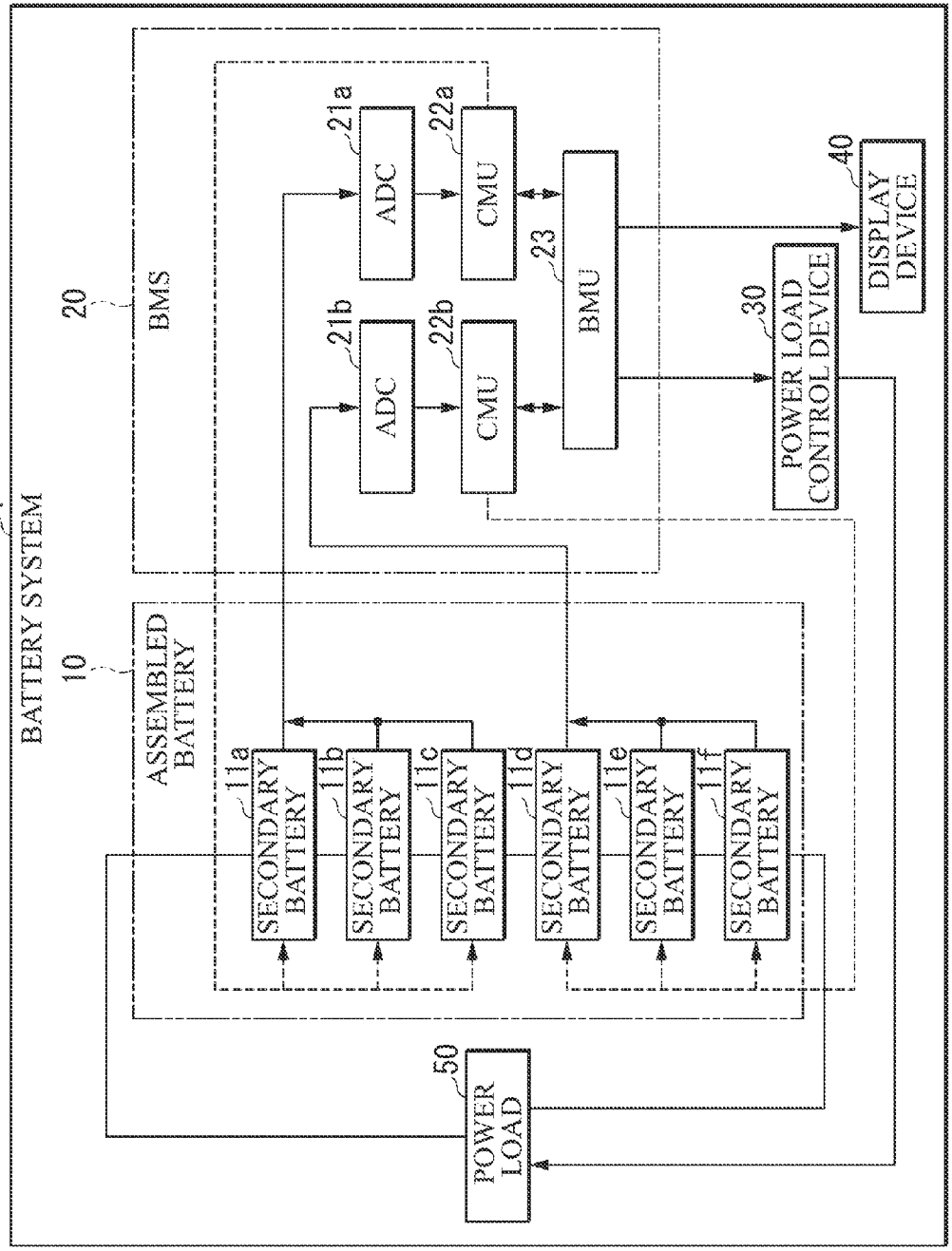
FIG. 1 is a block diagram illustrating a configuration of a battery system.

Hereinafter, a battery system according to an embodiment of the invention will be described by referring to the drawings.

FIG. 1 is a block diagram illustrating a configuration of the battery system according to the embodiment.

In this drawing, the reference sign 1 indicates the battery system. An example will be described in which the battery system 1 according to the embodiment is installed in an electric vehicle so as to supply electric power to the electric vehicle. The battery system includes: an assembled battery 10; a BMS (Battery Management System) 20; a power load control device 30; a display device 40; and a power load 50.

The assembled battery 10 is configured to supply electric power to the power load 50 of the electric vehicle and is formed by connecting plurality of secondary batteries 11c to 11f (hereinafter, generally referred to as a secondary battery 11) in series to each other.

Further, the BMS 20 is a process unit that monitors and controls the secondary battery 11 which constitutes the assembled battery 10. The BMS 20 includes ADCs 21a and 21b, CMU 22a and 22b, and a BMU 23. Further, the power load control device 30 is a process unit that controls the power load 50 on the basis of the control from the BMS 20, and the display device 40 is a process unit that displays the SOC (charge rate) and the like of the secondary battery 11 constituting the assembled battery 10 on the basis of the control from the BMS 20. The BMS 20 and the assembled battery 10 are connected to each other through a signal line. Further, the BMS 20 and the power load control device 30, the BMS 20 and the display device 40 are connected to each other through signal lines, and the power load control device 30 and the power load 50 are connected to each other through a signal line. Further, the power load 50 is connected to the assembled battery 10 through an electric power line.

The power load 50 is, for example, an electric power converter such as an electric motor or an inverter connected to a vehicle wheel of an electric vehicle, and the power load control device 30 controls the operation of the electric power converter such as an inverter or the number of rotations of the electric motor. Further, the power load 50 may be an electric motor which drives a wiper or the like.

Further, the battery system 1 may be not only the electric vehicle, but also for example, a mobile vehicle such as an industrial vehicle like a forklift, a train, and an airplane or a ship in which a propeller or a screw is connected to the electric motor serving as the power load 50. Furthermore, the battery system 1 may be installed in, for example, a stationary system such as a home electric storage system or a system interconnection facilitating electric storage system which is combined with a natural energy generating facility such as a windmill or a solar power generating system. That is, the battery system 1 includes a system that uses charging and discharging of electric power due to the secondary battery.

Further, as described above, the BMS 20 of the battery system 1 includes: the ADCs (Analog Digital Converters) 21a and 21b (hereinafter, generally referred to as the ADC 21); the CMU (Cell Monitor Units) 22a and 22b (hereinafter, generally referred to as the CMU 22); and the BMU (Battery Management Unit) 23.

The ADC 21 performs a process in which a signal of a parameter value representing the state of the secondary battery 11 is received as an analogue signal from the secondary battery 11, the analogue signal is converted into a digital signal, and the digital signal is output to the CMU 22. In the embodiment, the parameter value which represents the state of the secondary battery 11 includes a current value, a voltage value, a temperature of a casing of the secondary battery, and the like. In addition, the parameter value may include a difference in the potential between the casing of the secondary battery 11 formed of a conductive material and the positive electrode of the secondary battery 11 (hereinafter, referred to as a can potential). That is, various values which change depending on the state of the secondary battery 11 may be adopted.

Further, the CMU 22 performs a process in which the parameter value received by the ADC 21 is output to the BMU 23. Further, the CMU 22 performs a process of managing the plurality of secondary batteries 11. In the embodiment, as shown in FIG. 1, the CMU 22a is connected to three secondary batteries 11a, 11b, and 11c by signal lines through the ADC 21a. Further, the CMU 22b is connected to three secondary batteries 11d, 11e, and 11f by signal lines through the ADC 21b.

Further, the BMU 23 performs a process in which the maximum and minimum SOC of the present SOC of the plurality of secondary batteries 11 are calculated on the basis of the parameter value received from the CMU 22 and a signal representing the values of the SOC is output. The BMU 23 is connected to the plurality of CMU 22 through signal lines, and performs a process in which the plurality of secondary batteries 11 constituting the assembled battery 10 are intensively managed on the basis of the information obtained from the plurality of CMU 22.

Figure 2:
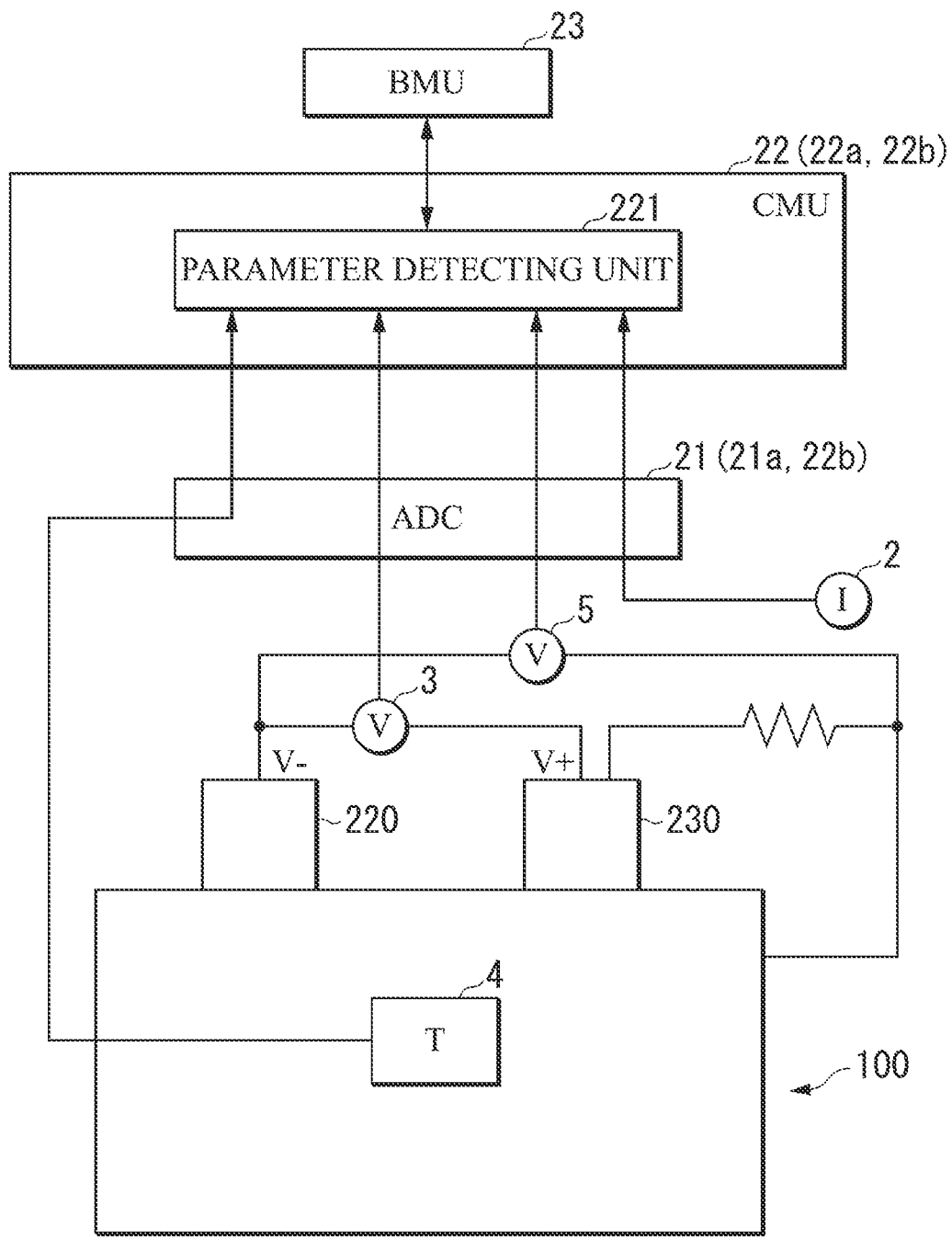
FIG. 2 is a diagram illustrating a connection example between a secondary battery, an ADC, and a CMU through signal lines.

FIG. 2 is a diagram illustrating a connection example between the secondary battery, the ADC, and the CMU through the signal lines.

The ADC 21 converts the analogue signals of the parameter values such as the current value output from the secondary battery 11, the voltage value of the secondary battery 11, the can potential of the secondary battery 11, and the temperature of the secondary battery 11 into digital signals and outputs the digital signals to the CMU 22.

Further, the CMU 22 includes a parameter detecting unit 221 which receives the signals of the parameter values from the ADC 21 and detects the respective parameter values.

When the parameter value is the voltage value of the secondary battery 11, the parameter detecting unit 221 of the CMU 22 acquires the voltage value of the secondary battery 11 from a voltmeter 3 which is installed between a positive electrode terminal 230 and a negative electrode terminal 220 of the secondary battery 11 through the ADC 21.

Further, a temperature measuring circuit 4 is attached to a casing 100 of the secondary battery 11. The temperature measuring circuit 4 includes a sensor which measures the temperature of the secondary battery 11. Then, when the parameter value is the temperature, the parameter detecting unit 221 of the CMU 22 acquires data representing the temperature value, measured by the temperature measuring circuit 4, of the casing 100 of the secondary battery 11 which is attached to each casing 100 of the secondary battery 11 through the ADC 21.

Further, when the parameter value is the can potential, the parameter detecting unit 221 of the CMU 22 acquires the can potential from the voltmeter 5 which detects the potential between the casing 100 of the secondary battery 11 and the positive electrode terminal 230 of the secondary battery 11 through the ADC 21.

Further, when the parameter value is the current value output from the secondary battery 11, the parameter detecting unit acquires the current value from an ammeter 2 which is connected in series to the secondary battery 11.

Furthermore, since the current values are the same in the case of the direct circuit of the assembled battery 10, the measurement may be performed by the BMU 23. Since the BMU 23 and the CMU 22 may transmit and receive data therebetween, the current value which is measured by the BMU 23 may be provided for the CMU 22. The SOC by the unit of the secondary battery may be calculated by the CMU 22 or may be calculated by the BMU 23 which aggregates the information of the CMU 22.

Then, in the battery system 1 according to the embodiment, the BMS 20 calculates the maximum SOC representing the maximum value in the respective present SOC of the plurality of secondary batteries 11 constituting the assembled battery and the minimum SOC representing the minimum value in the respective present SOC of the secondary batteries 11, and generates and outputs a normal waveform signal which has the maximum SOC determined as the maximum peak and the minimum SOC determined as the minimum peak, wherein the waveform signal which is displayed in the SOC display range, which has the full SOC, in the case of the full charge state of the secondary battery 11, determined as the upper limit and the empty SOC, in the case of the empty charge state of the secondary battery, determined as the lower limit. Then, the display device 40 performs a process in which the normal waveform signal is received from the BMS 20 and the waveform represented by the normal waveform signal is displayed in the SOC display range.

(First Embodiment)

Figure 3:
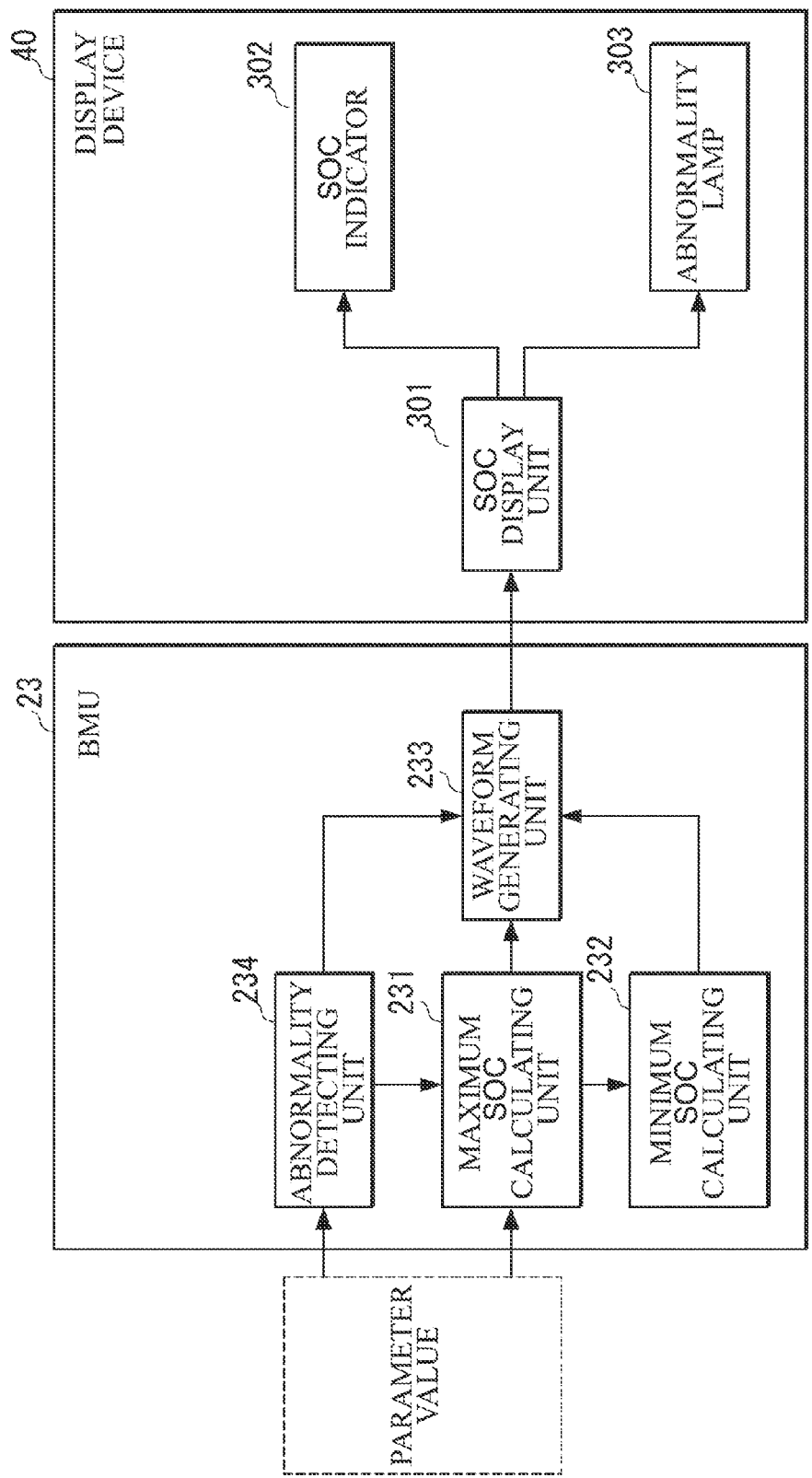
FIG. 3 is a diagram illustrating functional blocks of a BMU and a display device.
Figure 4:
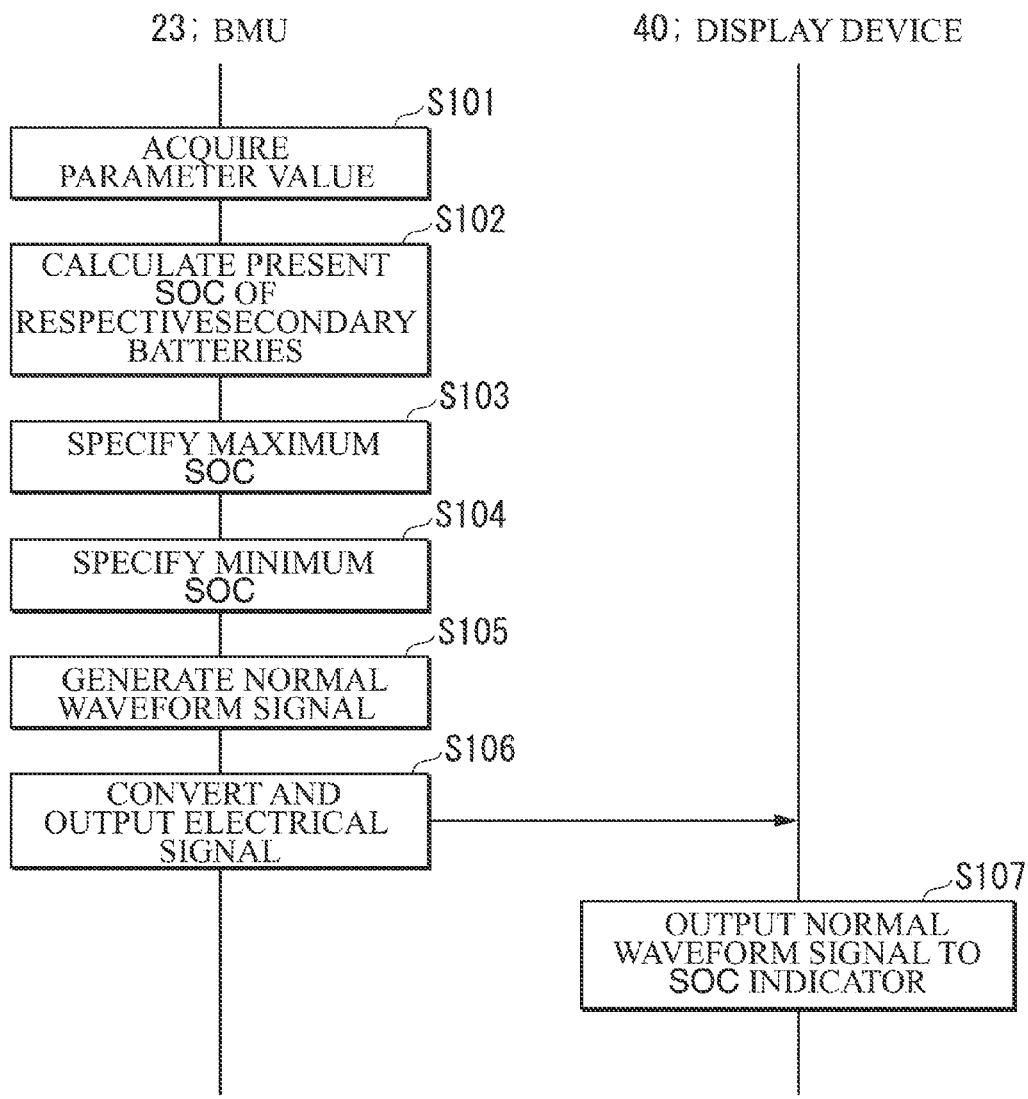
FIG. 4 is a first diagram illustrating a process flow of a battery system.
Figure 5:
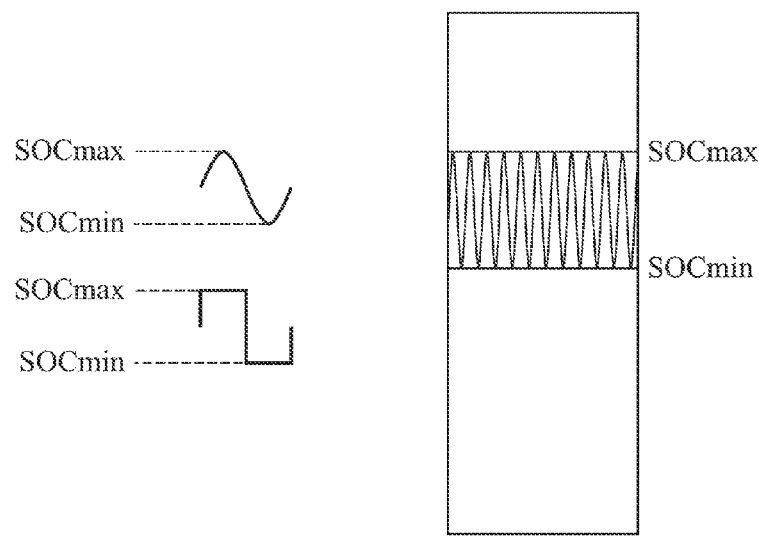
FIG. 5 is a diagram illustrating an image of a waveform which is displayed in a SOC indicator according to a first embodiment.

FIG. 3 is a diagram illustrating functional blocks of the BMU and the display device. FIG. 4 is a first diagram illustrating a process flow of the battery system. FIG. 5 is a diagram illustrating an image of a waveform which is displayed in a SOC indicator according to the first embodiment.

Next, referring to FIGS. 3 to 5, the process flow of the battery system 1 will be described according to the procedure thereof.

As shown in FIG. 3, the BMU 23 includes: a maximum SOC calculating unit 231; a minimum SOC calculating unit 232; a waveform generating unit 233; and an abnormality detecting unit 234. Further, the display device 40 includes: a SOC display unit 301; a SOC indicator 302; and an abnormality lamp 303.

First, the BMU 23 acquires parameter values such as voltage values of the respective secondary batteries 11a to 11f, current values output from the secondary batteries 11a to 11f connected in series to each other (when the BMU 23 directly measures the current value, the CMU 22 may not output the current value of the BMU 23 since the current value is acquired by the BMU 23), temperature values to the casings 100 of the respective secondary batteries 11a to 11f, and can potential of the secondary batteries 11a to 11f through the ADC 21 and the CMU 22 (step S101).

Then, the maximum SOC calculating unit 231 of the BMU 23 calculates the respective present SOC of the secondary batteries 11a to 11f by using any one or more of the voltage values, the current values, and the temperature values obtained as described above (step S102). Furthermore, in the state where the SOC by the unit of the secondary battery is calculated already by the CMU 22, in step 5101, the BMU 23 may directly acquire the SOC by the unit of the secondary battery. In this case, the calculation of the SOC by the unit of the secondary battery using the BMU 23 is omitted in step S102. Then, when the SOC by the unit of the secondary battery is calculated, the maximum SOC calculating unit 231 specifies the maximum SOC from the SOC (step S103). Further, the minimum SOC calculating unit 232 specifies the minimum SOC from the respective present SOC of the secondary batteries 11a to 11f calculated by the maximum SOC calculating unit 231 (step S104).

Here, for example, when the SOC is calculated by using the voltage value, the maximum SOC calculating unit 231 or the minimum SOC calculating unit 232 may store the SOC corresponding to the voltage value in the SOC storage table inside the BMU 23 (or inside the CMU 22) in advance and calculate the respective present SOC of the secondary batteries 11a to 11f through interpolation calculation using a relationship between the acquired voltage value and the voltage value and the SOC stored in the SOC storage table. Then, the maximum SOC calculating unit or the minimum SOC calculating unit specifies the maximum SOC or the minimum SOC from the SOC.

Further, for example, when the SOC is calculated by using the current value, the maximum SOC calculating unit 231 or the minimum SOC calculating unit 232 may calculate the respective SOC of the secondary batteries 11a to 11f by integrating the current values which are charged and discharged to the secondary battery 11 from a certain SOC state. Then, the maximum SOC calculating unit or the minimum SOC calculating unit specifies the maximum SOC or the minimum SOC from the SOC.

In addition, in the case of the method of calculating the SOC, the SOC may be calculated according to any method.

Then, the maximum SOC which is specified by the maximum SOC calculating unit 231 is output to the waveform generating unit 233. Further, the minimum SOC which is specified by the minimum SOC calculating unit 232 is output to the waveform generating unit 233. Then, on the assumption that one period is denoted by T(s) and the start of one period is denoted by the time t=0 s, the waveform generating unit 233 generates the signal of the waveform of the SOC (hereinafter, referred to as a normal waveform signal) by using the following equation (1) of calculating the charge rate (SOC) (step S105), converts the signal into an electrical signal, and outputs the electrical signal to the SOC display unit 301 (step S106).

[Equation 1]

$$SOC=(SOC\ max+SOC\ min)/2+(SOC\ max-SOC\ min)/2 \times SIN(2\pi t/T) \quad (1)$$

Next the SOC display unit 301 outputs the normal waveform signal shown in FIG. 5 to the SOC indicator 302 (step S107). For example, the SOC indicator 302 displays a bright line on a display unit such as a vertically elongated rectangular liquid crystal. When the bright line is displayed at the uppermost position of the display unit, this means that the SOC of any one secondary battery 11 of the secondary batteries 11a to 11f is in a full charge state (SOCFULL). When the bright line is displayed at the lowermost position of the display unit, this means that the SOC of any one secondary battery 11 of the secondary batteries 11a to 11f is in an empty charge state (SOCEMPTY). When the SOC display unit 301 outputs the normal waveform signal to the SOC indicator 302, the SOC indicator 302 displays a sine waveform bright line using the normal waveform signal which has the maximum SOC determined as the maximum peak and the minimum SOC determined as the minimum peak, wherein the waveform signal which is displayed in the SOC display range which has the full SOC, in the case of the full charge state of the secondary battery, determined as the upper limit and the empty SOC, in the case of the empty charge state of the secondary battery determined as the lower limit.

Furthermore, the above-described equation (1) is an equation that represents a sine wave, but the invention is not limited thereto. For example, the normal waveform signal representing a cosine wave may be output. Further, in the above-described equation (1), an advance or a delay of arbitrary phase may be added. Further, as the normal waveform signal, the waveform generating unit 233 may generate a square waveform signal in which the value of the maximum SOC is determined as the maximum peak and the value of the minimum SOC is determined as the minimum peak instead of the sine wave or the cosine wave, convert the signal into an electrical signal, and then output the electrical signal. When the square waveform normal waveform signal is output, the waveform generating unit 233 outputs the normal waveform signal which represents SOC (charge rate)=maximum charge rate (SOCmax) between $0 \leq t < t/2(s)$ and SOC=minimum charge rate (SOCmin) between $t/2(s) \leq t < T(s)$. Furthermore, the waveform generating unit may output the normal waveform signal which represents SOC (charge rate)=minimum SOC between $0 \leq t < t/2(s)$ and SOC=maximum SOC between $t/2(s) \leq t < T(s)$. Further, the waveform generating unit may output a normal waveform signal in which the maximum charge rate and the minimum charge rate are switched by a smooth waveform instead of a steep waveform so that the square wave is not rectangular.

By the above-described process, the present maximum and minimum SOC from the SOC of the plurality of secondary batteries 11 constituting the assembled battery 10 may be informed from the BMU 23 to the display device 40 only by one normal wave signal. Thus, at the time of displaying the maximum SOC and the minimum SOC in the SOC indicator 302, the BMU 23 and the display device 40 may be connected to each other through one signal line, thereby simplifying the configuration. Further, a user who sees the SOC indicator 302 in which the bright line of the normal waveform signal is displayed may easily recognize the present maximum and minimum SOC from the SOC of the plurality of secondary batteries 11 constituting the assembled battery 10 through the maximum peak and the minimum peak of the waveform.

(Second Embodiment)

Figure 6:
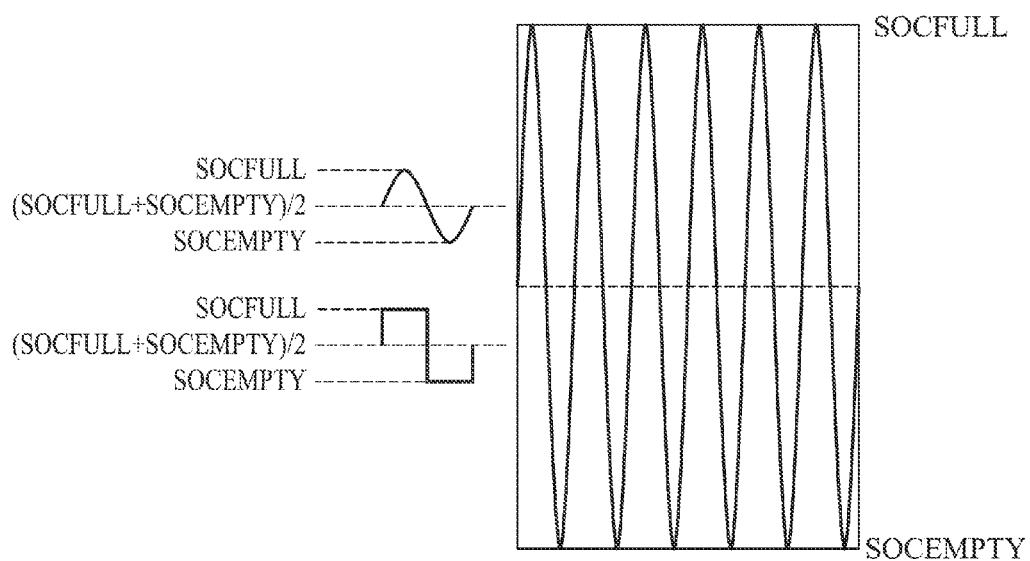
FIG. 6 is a diagram illustrating an image of a waveform which is displayed in a SOC indicator according to a second embodiment.

FIG. 6 is a diagram illustrating an image of a waveform which is displayed in a SOC indicator according to a second embodiment.

Next, a process will be described which is performed when an abnormality is detected in the secondary battery constituting the assembled battery.

As described above, the BMU 23 acquires parameter values such as voltage values of the respective secondary batteries 11a to 11f, current values output from the respective secondary batteries 11a to 11f connected in series to each other, temperature values of the casings 100 of the respective secondary batteries 11a to 11f, and the can potentials of the secondary batteries 11a to 11f through the ADC 21 and the CMU 22. Then, the abnormality detecting unit 234 of the BMU 23 determines whether the abnormality occurs in the second battery on the basis of the parameter values. For example, when the voltage values, the current values, the can potentials, and the temperatures are equal to or larger than the threshold value, the abnormality detecting unit determines that abnormality occurs in the secondary battery. Then, when the abnormality is determined, the abnormality detecting unit 234 outputs an abnormal signal to the waveform generating unit 233. Further, the maximum SOC calculating unit 231 or the minimum SOC calculating unit 232 respectively outputs the calculated maximum or minimum SOC to the waveform generating unit 233 as in the first embodiment.

In general, the waveform generating unit 233 generates and outputs the normal waveform signal as in the first embodiment. However, when the waveform generating unit 233 receives the abnormal signal from the abnormality detecting unit 234, the waveform generating unit generates the abnormal waveform signal as the signal of the abnormal waveform by using the abnormal signal calculating equation of the following equation (2) on the assumption that one period is denoted by T(s) and the start of one period is denoted by the time t=0 s, converts the abnormal waveform signal into an electrical signal instead of the normal waveform signal, and then outputs the electrical signal to the SOC display unit 301.

[Equation 2]

$$SOC=(SOCFULL+SOCEMPTY)/2+(SOCFULL-SOCEMPTY)/2 \times SIN(2\pi t/T) \quad (2)$$

Next the SOC display unit 301 outputs the abnormal waveform signal shown in

FIG. 6 to the SOC indicator 302. With regard to the abnormal waveform shown in the equation (2), it is a waveform in which the position indicating the full charge state (SOCFULL) of the uppermost portion of the display unit of the SOC indicator 302 is determined as the maximum peak and the position indicating the empty charge state (SOCEMPTY) of the lowermost portion of the display unit is determined as the minimum peak, and the waveform has an amplitude from the uppermost portion to the lowermost portion about the boundary which is the center of the vertical direction of the display unit. Accordingly, in this way, since the bright line of the waveform which largely changes in the entire display unit of the SOC indicator 302 is output to the display unit of the SOC indicator 302, it is possible to provide a battery system which allows a user to easily recognize abnormality in the secondary battery 11 when an abnormality occurs in the secondary battery 11.

Furthermore, as well as the normal waveform signal, the waveform generating unit 233 may generate a square waveform signal in which the position indicating the full charge rate (SOCFULL) of the uppermost portion of the display unit is determined as the maximum peak and the position indicating the empty charge rate (SOCEMPTY) of the lowermost portion of the display unit is determined as the minimum peak instead of the sine wave or the cosine wave as the abnormal waveform signal, convert the signal into an electrical signal, and then output the electrical signal. When the square waveform abnormal waveform signal is output, the waveform generating unit 233 outputs the abnormal waveform signal which represents the full charge rate (SOCFULL) between $0 \leq t < t/2(s)$ and the empty charge rate (SOCEMPTY) between $t/2(s) \leq t < T(s)$. Furthermore, the waveform generating unit may output the abnormal waveform signal which represents the empty charge rate (SOCEMPTY) between $0 \leq t < t/2(s)$ and the full charge rate (SOCFULL) between $t/2(s) \leq t < T(s)$. Further, the waveform generating unit may output an abnormal waveform signal in which the waveforms of the full charge rate (SOCFULL) and the empty charge rate (SOCEMPTY)

are switched by a smooth waveform instead of a steep waveform so that the square wave is not rectangular.

(Third Embodiment)

Figure 7:
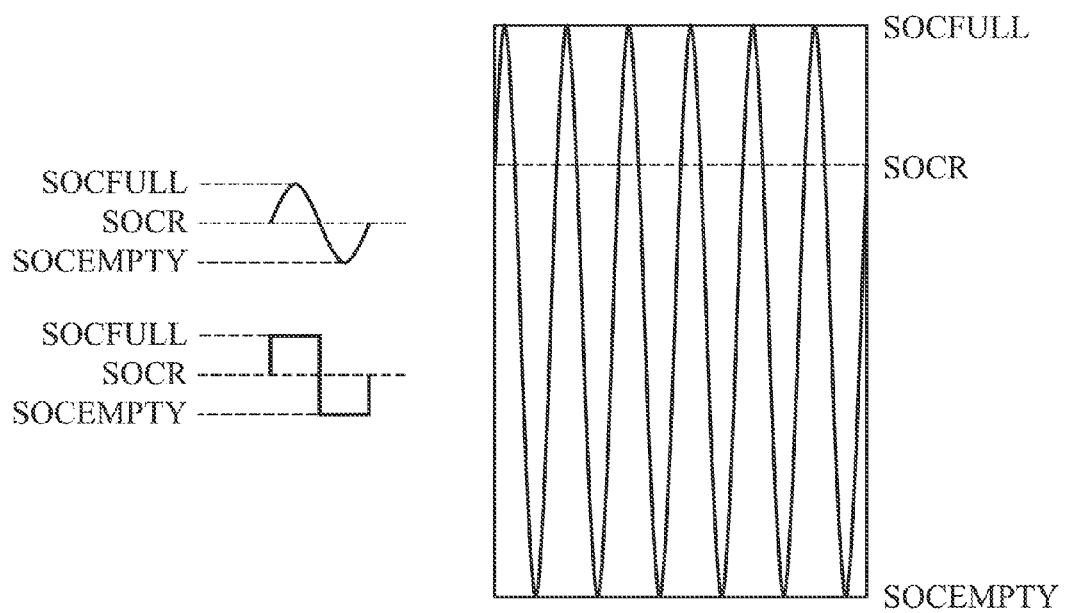
FIG. 7 is a diagram illustrating an image of a waveform which is displayed in a SOC indicator according to a third embodiment.

FIG. 7 is a diagram illustrating an image of a waveform which is displayed in a SOC indicator according to a third embodiment.

Further, when the abnormality in the secondary battery 11 is detected, the waveform generating unit 233 may generate and output an abnormal waveform signal in which a SOC SOCR (an index SOC which is a predetermined value among the maximum SOC, the minimum SOC, and the average value of the SOC of the plurality of secondary batteries (for example, the average value is calculated by the waveform generating unit 233)) specified by the waveform generating unit 233 may be expressed as the abnormal waveform as the abnormal waveform signal in which the above-described abnormal waveform may be displayed in the SOC indicator 302. In this case, on the assumption that one period is denoted by T(s) and the start of one period is denoted by the time t=0 s, the waveform generating unit 233 generates the abnormal waveform signal as the signal of the abnormal waveform by using the abnormal signal calculating equation of the following equations (3) and (4), converts the abnormal waveform signal into an electrical signal instead of the normal waveform signal, and then outputs the electrical signal to the SOC display unit 301.

[Equation 3]

$$SOC = SOCR + (SOCFULL - SOCR) \times SIN(2\pi t/T)$$
$$\langle 0 \leq t < T/2 \rangle \quad (3)$$

[Equation 4]

$$SOC = SOCR + (SOCR - SOCEMPTY) \times SIN(2\pi t/T) \langle T/2 \leq t < T \rangle \quad (4)$$

Then, the SOC display unit 301 outputs the abnormal waveform signal shown in FIG. 7 to the SOC indicator 302. With respect to the abnormal waveform shown in the equations (3) and (4), the maximum peak of the waveform indicates the full charge rate (SOCFULL) of the uppermost portion of the display unit of the SOC indicator 302, and the minimum peak of the waveform indicates the empty charge rate (SOCEMPTY) of the lowermost portion of the display unit of the SOC indicator 302. Then, the value which is represented by the SOC (the SOC representing the line connecting the inflection points) of the base position serves as the reference of the amplitude of the abnormal waveform is SOCR. Thus, since the bright line of a waveform which largely changes in the entire display unit of the SOC indicator 302 is output to the display unit of the SOC indicator 302, it is possible to provide a battery system which allows a user to easily recognize abnormality in the secondary battery 11 when an abnormality occurs in the secondary battery 11. Also, since the predetermined charge rate SOCR specified by the waveform generating device is displayed, the user may recognize a charge rate SOCR (a value which is specified by the waveform generating unit 233 such as a maximum SOC of the secondary battery, a minimum SOC thereof, or an average value of the SOC of the plurality of secondary batteries) in the secondary batteries 11.

Then, in the third embodiment, when the abnormal waveform signal is output as a square wave instead of a sine wave, the waveform generating unit 233 outputs the abnormal waveform signal of SOC=SOCR in the range of $0 \leq t < T/4$, SOC=SOCFULL in the range of $T/4 \leq t < 2T/4$, SOC=SOCR in the range of $2T/4 \leq t < 3T/4$, and SOC=SOCEMPTY in the range of $3T/4 \leq t < T$.

With regard to the output of the abnormal waveform signal, the waveforms of the full charge rate (SOCFULL) and the empty charge rate (SOCEMPTY) may be switched by a smooth waveform instead of a steep waveform so that the square wave is not rectangular.

Furthermore, in the above-described process, when the waveform generating unit 233 receives the abnormal signal from the abnormality detecting unit 234, the normal waveform signal and the abnormal waveform signal which are switched are output, but the normal waveform signal and the abnormal waveform signal may be alternately output to the SOC display unit 301.

Further, the frequency of the above-described normal or abnormal waveform signal is configured as a frequency in which a residual image is left in the SOC indicator 302. For example, since the time resolution of eyes of a person is about 50 ms to 100 ms, it is possible to display a bright line of a waveform which forms a residual image in the SOC indicator 302 by setting the normal or abnormal waveform signal of a frequency of 20 Hz or more.

Further, in the above-described process, when a difference between the maximum SOC and the minimum SOC of the normal waveform signal is equal to or larger than a predetermined threshold value, it may be determined that the value of the SOC of only any one secondary battery 11 is different from the value of the other SOC. In this case, the SOC display unit 301 of the display device 40 may determine that the SOC of the specific secondary battery 11 is abnormal, and turns on the abnormality lamp 303 by outputting the abnormal signal. Thus, even when the abnormal waveform signal does not output, the display device may inform the abnormality.

With the above-described process, according to the battery system 1 of the embodiment, it is possible to provide the battery system which allows a user to easily recognize the SOC of the secondary battery while the device using the assembled battery as the power supply has a simple configuration. Further, according to the battery system 1 of the embodiment, the abnormality in the secondary battery 11 may be promptly specified. Then, since the abnormal secondary battery 11 may be promptly specified, for example, when the secondary battery 11 which is in the abnormal state is replaced or maintained, the safety of the electric vehicle serving as the battery system may be improved.

Furthermore, the CMU 22 or the BMU 23 of the above-described battery system 1 includes a computer system therein. Then, the above-described process procedure may be stored in a storage medium which is readable as a format of a program, and when the program is read and executed by the computer, the above-described process is performed.

Further, in FIG. 1, an example has been described in which plurality of CMU 22 are present in the BMS 20. However, only one CMU 22 may be present in the BMS 20, and the CMU 22 may manage all secondary batteries 11a to 11f constituting the assembled battery 10. Further, the CMU 22 may have a part of a process function of the BMU 23 and the BMU 23 may have a part of a process function of the CMU 22.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

Industrial Applicability

The invention relates to a battery system that includes a battery control device and a display device.

The battery control device includes a maximum SOC calculating unit that calculates a maximum SOC representing a maximum value from present SOC of a plurality of secondary batteries constituting an assembled battery, a minimum SOC calculating unit that calculates a minimum SOC representing a minimum value from the present SOC of the respective secondary batteries, and a waveform generating unit that generates a normal waveform signal which has the maximum SOC determined as a maximum peak and the minimum SOC determined as a minimum peak, wherein a waveform signal which is displayed in a SOC display range which has a full SOC, in the case of a full charge state of the secondary battery, determined as an upper limit and an empty SOC, in the case of an empty charge state of the secondary battery, determined as a lower limit. The display device includes a SOC display unit that displays the normal waveform signal in the SOC display range.

According to the invention, the user of the device may easily recognize the SOC of the secondary battery while the device using the assembled battery as a power supply has a simple configuration.

Reference Signs List
1: BATTERY SYSTEM
10: ASSEMBLED BATTERY
11: SECONDARY BATTERY
20: BMS (BATTERY CONTROL DEVICE)
21: ADC
22: CMU
23: BMU
30: POWER LOAD CONTROL DEVICE
40: DISPLAY DEVICE
50: POWER LOAD
221: PARAMETER DETECTING UNIT
231: MAXIMUM SOC CALCULATING UNIT
232: MINIMUM SOC CALCULATING UNIT
233: WAVEFORM GENERATING UNIT
234: ABNORMALITY DETECTING UNIT
301: SOC DISPLAY UNIT
302: SOC INDICATOR
303: ABNORMALITY LAMP

The invention claimed is:

1. A battery system comprising:
a battery control device; and
a display device,
wherein the battery control device includes
a maximum charge rate calculating unit that calculates a charge rate of each of a plurality of secondary batteries constituting an assembled battery and specifies a maximum charge rate representing a maximum value from present charge rates that have been calculated,
a minimum charge rate calculating unit that calculates the charge rate of each of the secondary batteries and specifies a minimum charge rate representing a minimum value from present charge rates that have been calculated, and
a waveform generating unit that generates a normal waveform signal which has the maximum charge rate determined as a maximum peak and the minimum charge rate determined as a minimum peak, wherein a waveform signal which is displayed in a charge rate display range which has a full charge rate, in the case of a full charge state of the secondary battery, determined as an upper limit and an empty charge rate, in the case of an empty charge state of the secondary battery, determined as a lower limit, and
wherein the display device includes
a charge rate display unit that displays the normal waveform signal in the charge rate display range.

2. The battery system according to claim 1, further comprising:
an abnormality detecting unit that detects abnormality in the secondary battery,
wherein the waveform generating unit generates an abnormal waveform signal in which the full charge rate is determined as the maximum peak and the empty charge rate is determined as the minimum peak, and
wherein the charge rate display unit displays the abnormal waveform signal in the charge rate display range instead of the normal waveform signal.

3. The battery system according to claim 2,
wherein the charge rate display unit alternately displays the normal waveform signal and the abnormal waveform signal in the charge rate display range.

4. The battery system according to claim 3,
wherein the waveform generating unit generates the abnormal waveform signal in which a value of an index charge rate calculated from the present charge rates of the respective secondary batteries is determined as a base position of a waveform.

5. The battery system according to claim 3,
wherein the display device includes an abnormal signal output unit that outputs an abnormal signal representing abnormality in the assembled battery when a difference between the maximum charge rate and the minimum charge rate is equal to or larger than a threshold value.

6. The battery system according to claim 2,
wherein the waveform generating unit generates the abnormal waveform signal in which a value of an index charge rate calculated from the present charge rates of the respective secondary batteries is determined as a base position of a waveform.

7. The battery system according to claim 6,
wherein the display device includes an abnormal signal output unit that outputs an abnormal signal representing abnormality in the assembled battery when a difference between the maximum charge rate and the minimum charge rate is equal to or larger than a threshold value.

8. The battery system according to claim 2,
wherein the display device includes an abnormal signal output unit that outputs an abnormal signal representing abnormality in the assembled battery when a difference between the maximum charge rate and the minimum charge rate is equal to or larger than a threshold value.

9. The battery system according to claim 1, further comprising:
an abnormality detecting unit that detects abnormality in the secondary battery,
wherein the waveform generating unit generates an abnormal waveform signal which has the full charge rate determined as the maximum peak and the empty charge rate determined as the minimum peak, and
wherein the charge rate display unit displays the normal waveform signal and the abnormal waveform signal in the charge rate display range.

10. The battery system according to claim 9,
wherein the waveform generating unit generates the abnormal waveform signal in which a value of an index charge rate calculated from the present charge rates of the respective secondary batteries is determined as a base position of a waveform.

11. The battery system according to claim 9,
wherein the display device includes an abnormal signal output unit that outputs an abnormal signal representing abnormality in the assembled battery when a difference between the maximum charge rate and the minimum charge rate is equal to or larger than a threshold value.

12. The battery system according to claim 1,
wherein the display device includes an abnormal signal output unit that outputs an abnormal signal representing abnormality in the assembled battery when a difference between the maximum charge rate and the minimum charge rate is equal to or larger than a threshold value.

* * * * *